United States Patent
Iwamoto

(10) Patent No.: US 10,116,877 B2
(45) Date of Patent: Oct. 30, 2018

(54) IMAGE PROCESSING APPARATUS AND IMAGE PROCESSING METHOD

(71) Applicant: CANON KABUSHIKI KAISHA, Tokyo (JP)

(72) Inventor: Yasuhiko Iwamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/351,245

(22) Filed: Nov. 14, 2016

(65) Prior Publication Data

US 2017/0142348 A1  May 18, 2017

(30) Foreign Application Priority Data

Nov. 17, 2015  (JP) ................................ 2015-225085

(51) Int. Cl.
G02B 13/16 (2006.01)
H04N 5/225 (2006.01)
H04N 5/262 (2006.01)

(52) U.S. Cl.
CPC ................................ *H04N 5/2621* (2013.01)

(58) Field of Classification Search
CPC .......................... H04N 5/23212; H04N 5/2361
USPC ............... 348/335, 340, 345, 348, 350, 352
See application file for complete search history.

(56) References Cited

U.S. PATENT DOCUMENTS

| | | |
|---|---|---|
| 4,965,840 A | 10/1990 | Subbarao |
| 6,320,979 B1 * | 11/2001 | Melen ................. G02B 21/367 348/E5.045 |

FOREIGN PATENT DOCUMENTS

| | | |
|---|---|---|
| JP | 2010-103651 A | 5/2010 |
| JP | 2010-177741 A | 8/2012 |

* cited by examiner

*Primary Examiner* — Yogesh Aggarwal
(74) *Attorney, Agent, or Firm* — Canon U.S.A., Inc. IP Division

(57) ABSTRACT

An image processing apparatus combines a partial area of a first image with a second image. The partial area to be combined with the second image is determined based on distance information with regard to a plurality of partial areas of the first image.

11 Claims, 3 Drawing Sheets

IMAGE PROCESSING APPARATUS AND IMAGE PROCESSING METHOD

BACKGROUND

Field

Technical Field

Aspects of the embodiment(s) relate to an image processing apparatus and an image processing method, and more particularly to image combining techniques.

Description of the Related Art

An apparatus including a function of displaying a composite image generated by combining a portion of a certain image (main image) with another image (sub image) has been available.

Normally, a sub image is non-transparent. Thus, an area of a main image combined with a sub image becomes hidden. Japanese Patent Laid-Open No. 2010-103651 proposes to determine an area of a main image to be combined with a sub image based on the position of a face area of a person detected in the main image.

However, Japanese Patent Laid-Open No. 2010-103651 does not disclose how to determine an area to be combined with a sub image when no face of a person is detected in a main image. Techniques disclosed by Japanese Patent Laid-Open No. 2010-103651 do not address a situation where the background area also includes an area undesired to be hidden, like a commemorative photo taken at a tourist spot.

SUMMARY

Embodiments of the invention provide an image processing apparatus including one or more processors, and a memory storing instructions which, when the instructions are executed by the one or more processors, cause the image processing apparatus to function as an obtaining unit configured to obtain a first image and a second image, a determination unit configured to determine a partial area of the first image as a composite area to be combined with the second image, and a combining unit configured to combine the second image with the composite area. The determination unit determines the composite area based on distance information with regard to a plurality of partial areas of the first image.

Further features will become apparent from the following description of exemplary embodiments with reference to the attached drawings.

DESCRIPTION OF THE EMBODIMENTS

Hereinafter, an exemplary embodiment will be described in detail with reference to the accompanying drawings. Although a digital camera that generates a captured image and distance information of a subject will be described below as an example of an image processing apparatus according to an embodiment of the invention, configurations for capturing an image or generating distance information of a subject are not essential to the embodiment of the invention. For example, it is only necessary that an image and distance information of a corresponding subject be obtained, and can be done so using any means, such as obtaining a pre-recorded image and distance information of a corresponding subject from a storage device or the like. Therefore, the embodiment of the invention can be implemented in any electronic equipment including a personal computer, a mobile phone, a game machine, etc.

Figure 1:
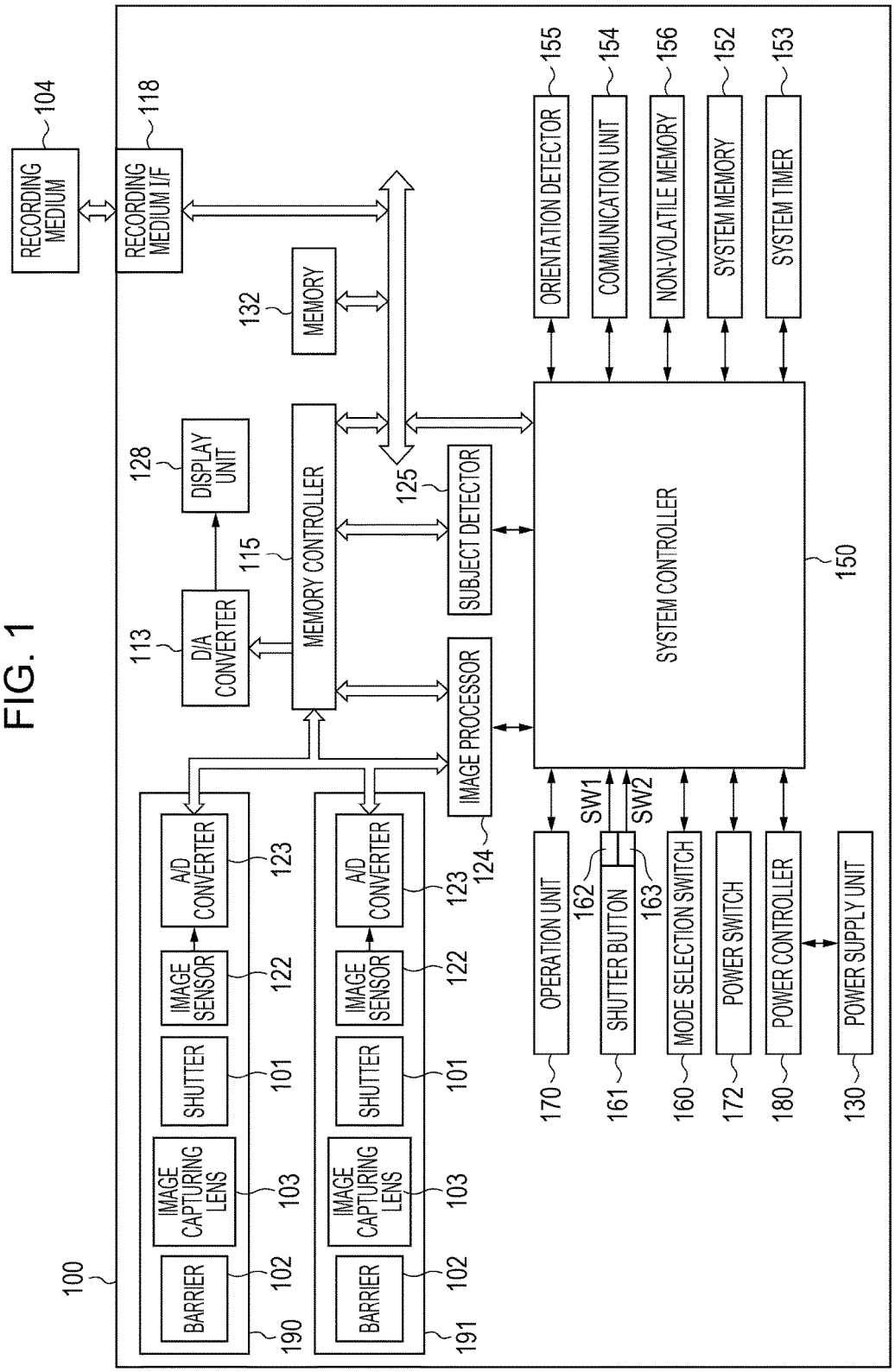
FIG. 1 is a diagram illustrating an exemplary functional configuration of a digital camera according to an embodiment.

FIG. 1 is a block diagram illustrating an exemplary functional configuration of a digital camera 100 according to the embodiment of the invention. The digital camera 100 is a multi-eye camera including a main image capturing unit 190 and a sub image capturing unit 191. Alternatively, the digital camera 100 can be a single-eye camera including one image capturing unit. The main image capturing unit 190 and the sub image capturing unit 191 each include a barrier 102, an image capturing lens 103, a shutter 101, an image sensor 122, and an analog-to-digital (A/D) converter 123.

The barrier 102 is a movable member that covers the tip of the image capturing lens 103. The barrier 102 protects the image capturing lens 103 from external impact or dust mainly when the power is turned off.

The image capturing lens 103 includes a zoom lens and a focus lens, and forms an optical image of a subject on an imaging plane of the image sensor 122. The shutter 101 includes an aperture function.

The image sensor 122 includes color filters and an array of microlenses, and includes a configuration where a plurality of pixels is arranged two-dimensionally. Each pixel includes one microlens and a plurality of photoelectric converters (sub-pixels). Since a partial area of the exit pupil projected to the individual sub-pixels of each pixel is different from one another, a parallax image can be obtained from the individual outputs of sub-pixel groups with an equal partial area of the corresponding exit pupil. The image sensor 122 of the sub image capturing unit 191 can have a configuration where one photoelectric converter is provided for one microlens in each pixel.

The A/D converter 123 converts an analog signal output from the image sensor 122 to a digital signal and outputs the digital signal as image data.

In the embodiment, the optical axes of the main image capturing unit 190 and the sub image capturing unit 191 are parallel to each other, but the angle of view of the image capturing lens 103 is different between the main image capturing unit 190 and the sub image capturing unit 191. The image capturing range can be different between the main image capturing unit 190 and the sub image capturing unit 191. Alternatively, the image capturing range can be settable by the user.

An image processor 124 applies certain image processing to image data supplied from the A/D converter 123 or a memory controller 115. Image processing applied by the image processor 124 includes white balance adjustment, pixel interpolation, resizing such as size reduction, color interpolation (demosaicing), and color conversion. The image processor 124 calculates evaluation values used for auto-focus detection (AF) processing and auto-exposure control (AE) processing executed by a system controller 150, and supplies the system controller 150 with these evaluation values. The image processor 124 can perform processing regarding coding/decoding of image data. The image processor 124 generates distance information (distance map) from a pair of parallax images. The image processor 124 can distinguish a captured scene based on, for example, the image colors, luminance, or subject detection result.

A subject detector 125 executes a subject detection process on image data supplied from the image processor 124 via the memory controller 115, and identifies a subject area. The subject detector 125 executes subject detection using any technique of the related art, such as pattern patching. For example, the subject detector 125 can use a method that, in the case of detecting a person's face as a subject area, searches for the color of skin or a luminance pattern related to parts such as the eyes, nose, or mouth included in the face. The subject detector 125 outputs the presence/absence or the number of detected subject areas and information, such as the position, size, and reliability, with regard to each of the detected subject areas as detection results to the system controller 150.

A memory 132 stores image data obtained by converting, using the A/D converter 123, an analog signal obtained by the image sensor 122 to digital data, and image data for display on a display unit 128. Because the memory 132 functions as a buffer when images are successively captured, the memory 132 has a capacity that can store image data, as well as audio data in the case of a moving image. The memory 132 also functions as a video memory.

A digital-to-analog (D/A) converter 113 converts image data for display, stored in the memory 132, to an analog signal and supplies the display unit 128 with the analog signal.

The display unit 128 displays an image signal supplied from the D/A converter 113. When a moving image is captured and the moving image is displayed in real time on the display unit 128, the display unit 128 can function as an electronic viewfinder (live viewing function).

A non-volatile memory 156 is an electrically erasable and recordable memory. The non-volatile memory 156 stores constants for the operation of the system controller 150, and programs. The non-volatile memory 156 also stores a program for executing various operations, which will be described below.

The system controller 150 includes one or more microprocessors (central processing units (CPUs)) capable of executing programs, and controls the entire digital camera 100. The system controller 150 performs AF processing and AE processing using evaluation values supplied from the image processor 124, and applies control necessary for realizing functions in response to instructions from an operation unit 170. The system controller 150 determines a read-out mode of the image sensor 122, i.e., whether to read out a pair of parallax images or to perform addition read-out, and sets the determined read-out mode in the main image capturing unit 190.

A system memory 152 is a memory that expands constants or variables for the operation of the system controller 150, or programs read out from the non-volatile memory 156. A system timer 153 measures a time used for various types of control or the time of a built-in clock.

A mode selection switch 160 is an input device that inputs an instruction for changing the operation mode of the digital camera 100 to the system controller 150. Examples of operation modes include a still image mode, a moving image mode, and a play mode.

A first shutter switch 162 is turned on when a shutter button 161 is operated halfway or half-pressed, and generates a first shutter switch signal SW1 (image capturing preparation instruction). In response to the first shutter switch signal SW1, the system controller 150 starts operations such as AF processing, AE processing, auto-white balance (AWB) processing, electronic flash (EF) (pre-flash) processing, etc.

A second shutter switch 163 is turned on when the shutter button 161 is operated completely or full-pressed, and generates a second shutter switch signal SW2 (image capturing instruction). In response to the second shutter switch signal SW2, the system controller 150 starts a series of image capturing operations including reading of a signal from the image sensor 122 to writing of image data to a recording medium 104.

Operation members of the operation unit 170 are appropriately allocated with functions on a scene-by-scene basis by selecting and operating various function icons displayed on the display unit 128, and these operation members function as various function buttons. The function buttons include, for example, an end button, a return button, an image feed button, a jump button, a depth-of-field preview button, and an attribute change button. For example, when a menu button is pressed, a menu screen where various settings can be made is displayed on the display unit 128. The user can input various instructions using the menu screen displayed on the display unit 128, a four-direction button (directed up, down, left, and right), and a set button. When the display unit 128 is a touchscreen, the touchscreen is also included in the operation unit 170.

A power controller 180 includes a battery detecting circuit, a direct current (DC)-to-DC converter, and a switch circuit for switching a block to be electrically connected, and detects whether a battery is mounted, the battery type, and the remaining capacity of the battery. Based on the detection results and an instruction from the system controller 150, the power controller 180 controls the DC-DC converter and supplies each section, including the recording medium 104, with a necessary voltage for a necessary period of time.

A power supply unit 130 includes a primary battery such as an alkaline battery or a lithium battery, a secondary battery such as a NiCd battery, a NiMH battery, or a Li battery, and an alternating current (AC) adapter.

A recording medium interface (I/F) 118 is an interface with the recording medium 104, such as a memory card or a hard disk.

A power switch 172 is a switch that provides an instruction for turning on/off the power of the digital camera 100. When the power is turned on, the power controller 180 starts supplying a necessary voltage to each section of the digital camera 100, and the system controller 150 starts controlling the digital camera 100.

The recording medium 104 is a recording medium such as a memory card for recording captured images, and includes a semiconductor memory or the like.

A communication unit 154 establishes a wireless or wired connection and transmits/receives video signals and audio signals. The communication unit 154 is also connectable to a wireless local area network (LAN) or the Internet. The communication unit 154 transmits images, including live images, captured by the image sensor 122 and images recorded in the recording medium 104, and also receives image data or other various types of information from an external device.

An orientation detector 155 detects the orientation of the digital camera 100 with respect to the direction of gravitational force. Based on the orientation detected by the orientation detector 155, it can be determined whether an image captured by the image sensor 122 is an image taken while the digital camera 100 is in a horizontal or vertical position. The system controller 150 adds direction information in accordance with the orientation detected by the orientation detector 155 to an image file of an image captured by the image sensor 122, or rotates the image and records the rotated image. An acceleration sensor or a gyro sensor can be used as the orientation detector 155.

Generation of a distance map will now be described. There are no restrictions with regard to the method of generating a distance map, and any known method can be used. A distance map is information that represents a subject distance on a pixel-by-pixel basis, and can be a depth map where a luminance value represents a distance. These can also be referred to as a distance image or a depth image.

Since the image sensor 122 can obtain a pair of parallax images in the embodiment, a subject distance can be obtained on a pixel-by-pixel basis using techniques such as the stereo matching. Alternatively, mapping can be done in the form of each area's image displacement amount (parallax amount) obtained using a pair of parallax images or a defocus amount converted using a coefficient (K value) determined from the image displacement amount in accordance with an optical condition.

The defocus amount or the image displacement amount itself is not a value that indicates the absolute value of a subject distance. However, a map based on the defocus amount or the image displacement amount represents the relationship of the relative distance of a subject in an image. Only detection of a relative relationship of a subject distance is sufficient for implementing the embodiment, and the absolute value of a subject distance is not necessarily required. Therefore, a map based on the defocus amount or the image displacement amount can be used.

Alternatively, a distance map can be generated without using parallax images. For example, a subject distance on a pixel-by-pixel basis can be obtained by calculating a focus lens position where a contrast evaluation value becomes maximum on a pixel-by-pixel basis. Alternatively, distance information on a pixel-by-pixel basis can be obtained based on the corresponding relationship between blurring and distance from image data obtained by capturing the same scene a plurality of times while changing a focal distance and a point spread function (PSF) of the optical system. These techniques are described in, for example, Japanese Patent Laid-Open No. 2010-177741 and U.S. Pat. No. 4,965,840.

The digital camera 100 according to the embodiment generates a distance map when a main image is captured. When the main image is a moving image, a distance map can be generated on a frame-by-frame basis, or a distance map can be generated for a still image obtained by capturing a still image while capturing a moving image. The generated distance map can be recorded in association with a corresponding image in the recording medium 104.

With regard to an image for which a distance map will be generated, the system controller 150 applies control to read a pair of parallax images from the image sensor 122 and, using the pair of parallax images, the image processor 124 generates a distance map. After generating the distance map, the image processor 124 generates a to-be-recorded image by adding the pair of parallax images and stores the distance map and the to-be-recorded image in association with each other in the memory 132.

Figure 2A:
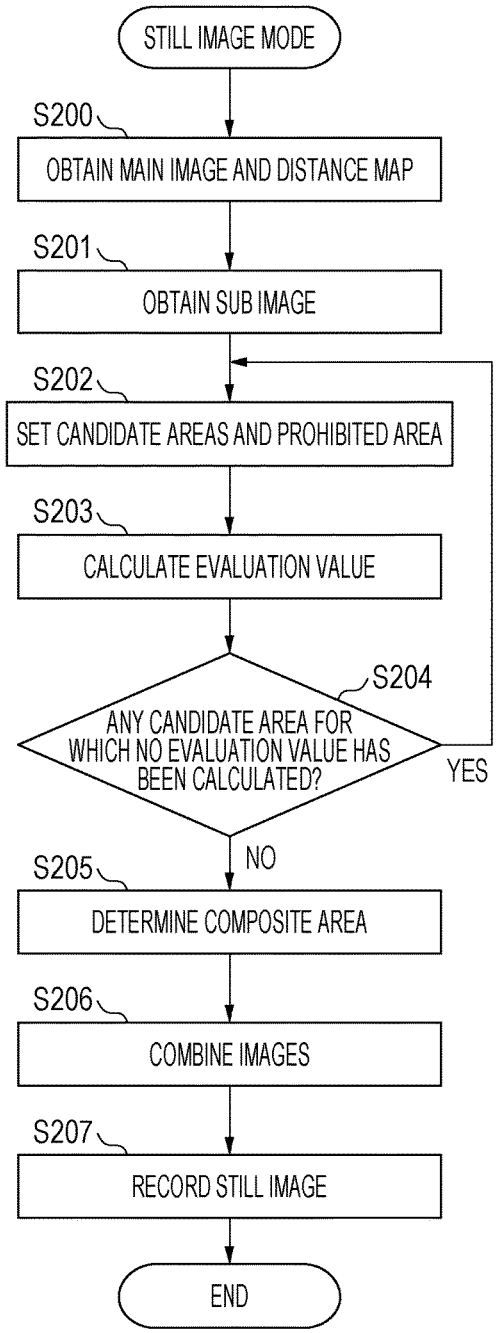
FIGS. 2A and 2B are flowcharts related to a composite image generating process according to the embodiment.
Figure 2B:
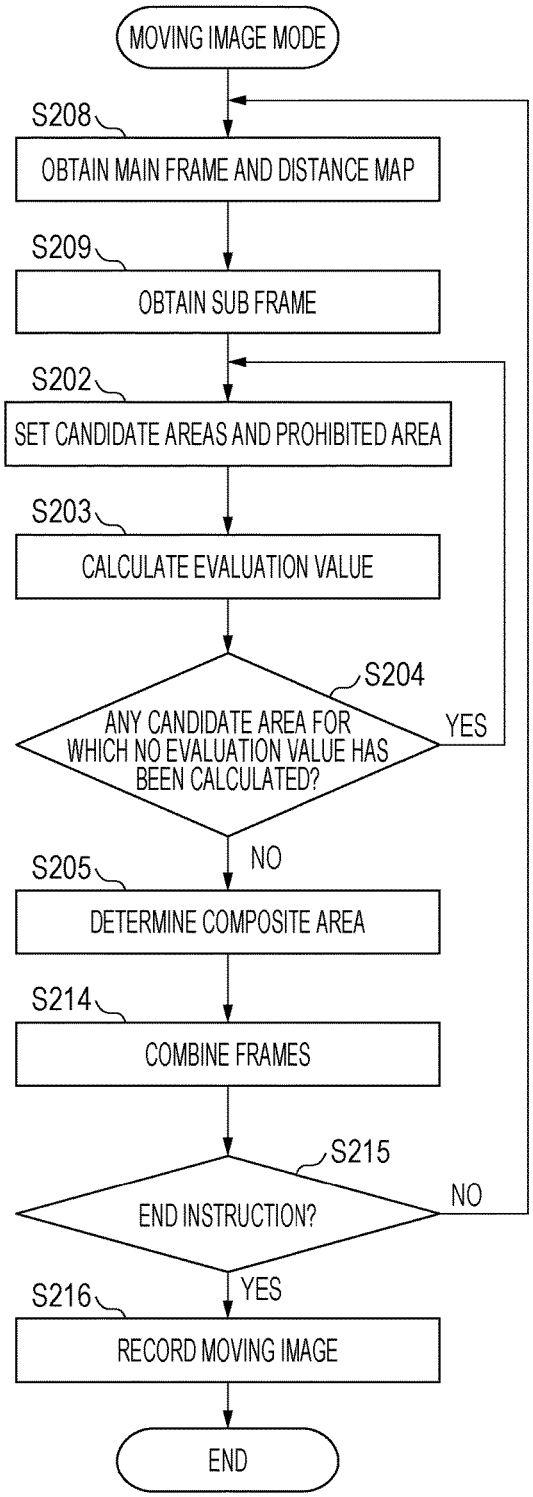

The operation in the still image mode and the moving image mode of the digital camera 100 according to the embodiment will be described next with reference to the flowcharts illustrated in FIGS. 2A and 2B. To simplify the description and understanding, it is assumed that a composite image will be generated both in the still image mode and the moving image mode. However, the user can be enabled to select whether to generate and record a composite image or to record only one or both of a main image and a sub image without generating a composite image.

Combining Operation in Still Image Mode

A composite image generating operation in the still image mode will now be described with reference to FIG. 2A.

In S200, the system controller 150 obtains a main image (first image) and a distance map associated with the main image. The main image and the distance map can be obtained by image capturing performed using the main image capturing unit 190, or can be obtained from the recording medium 104.

In S201, the system controller 150 obtains a sub image (second image). The sub image can be obtained by image capturing performed using the sub image capturing unit 191, or can be obtained from the recording medium 104. The sub image is smaller, i.e., the number of pixels is less, than the main image since settings have been made that way at the time of image capturing or image processing has been done that way after capturing the images. Alternatively, an area usable as a sub image can be specified by the user through the operation unit 170. In this case, to simplify the understanding and description, it is assumed that the sub image has a predetermined size that is sufficiently smaller than the main image.

In S202, the system controller 150 sets candidate areas and a prohibited area in the main image, which will be discussed in more detail below. In S203, the system controller 150 calculates an evaluation value for a candidate area selected based on the candidate areas and the prohibited area set in S202, which will be discussed in more detail below.

In S204, the system controller 150 determines whether there is any candidate area for which no evaluation value has been calculated, and, if it is determined that there is a candidate area for which no evaluation value has been calculated, the process returns to S202. Otherwise, the process proceeds to S205.

In S205, the system controller 150 determines a composite area from among the candidate areas based on the evaluation values calculated for these candidate areas by the processing in S202 to S204. For example, the system controller 150 can determine an area with the lowest evaluation value as a composite area.

In S206, the image processor 124 generates a composite image by combining the sub image obtained in S201 with the main image obtained in S200 based on the composite area determined in S205. When the sizes of the sub image and the composite area are different, the image processor 124 resizes the sub image to be less than or equal to the size of the composite area, and then combines the main image and the resized sub image.

In S207, the image processor 124 applies recording processing to the composite image generated in S206. For example, the recording processing includes file header generation and coding. The image processor 124 records an image file including the composite image in the recording medium 104 via the memory controller 115 and the recording medium I/F 118.

Candidate Area and Prohibited Area Setting Processing

Figure 3A:
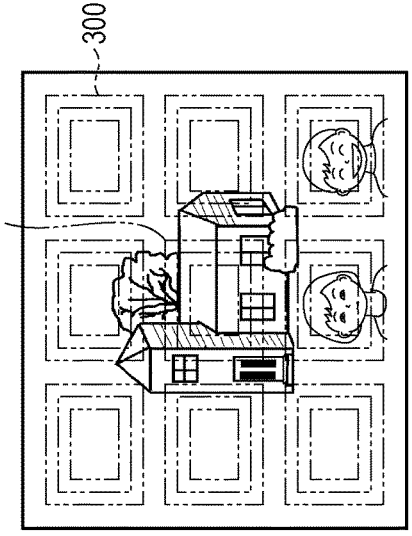
FIGS. 3A to 3D are diagrams illustrating exemplary settings of candidate areas and a prohibited area according to the embodiment.
Figure 3B:
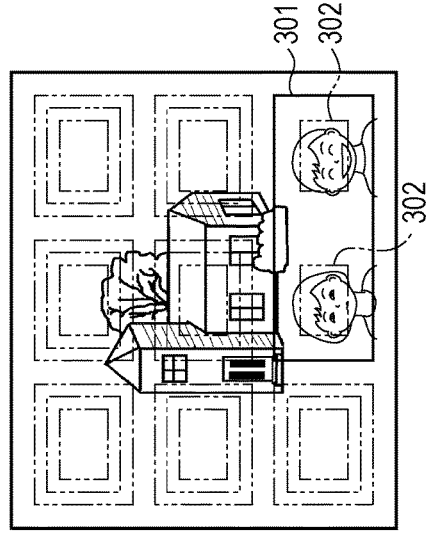

The details of the candidate area and prohibited area setting processing performed in S202 of FIG. 2A will now be described. FIG. 3A illustrates an exemplary main image. FIG. 3B illustrates exemplary candidate areas 300 set in the main image. The system controller 150 sets a plurality of partial areas of the entire main image as candidate areas while changing the position and size of the individual candidate areas step by step. FIG. 3B schematically illustrates an example in which candidate areas, each having one of three sizes, are set in each of areas obtained by dividing the main image in the horizontal direction and the vertical direction. In this example, the position of each candidate area is determined such that the center of the candidate area is identical to the center of a corresponding one of the divisional areas.

Figure 3C:
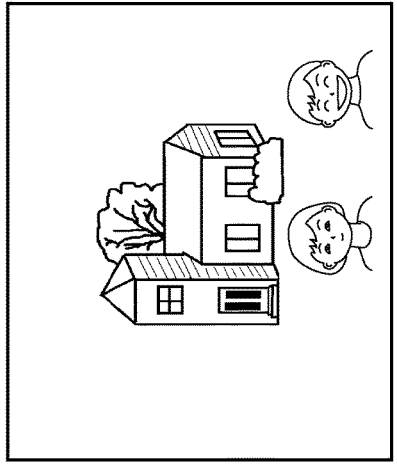

FIG. 3C is a diagram illustrating exemplary settings of candidate areas and a prohibited area. Like FIG. 3B, after the candidate areas 300 are set, a partial area of the image, which is the central area in this case, is set as a prohibited area 301. Control is applied to exclude a candidate area (candidate area 300' in FIG. 3B) that overlaps the prohibited area 301 from becoming the target of evaluation value calculation. In doing so, the central area of the image, which is generally highly likely to include a subject that the user wants to take a picture of, is controlled not to be a composite area. A prohibited area not based on subject detection is not limited to the central area of an image. For example, like the sky area of an image captured in an evening scene mode, an area that is highly likely to be important and that has a more or less determined position can be set as a prohibited area.

Figure 3D:
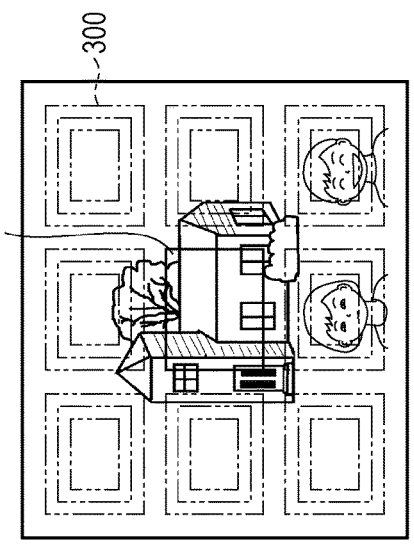

FIG. 3D is a diagram illustrating exemplary settings of a prohibited area different from FIG. 3C. In this example, subject areas 302 detected by the subject detector 125 and their surrounding area are set as a prohibited area 301. By applying control as in FIG. 3C, an area of a person who is a subject highly likely to be one that the user wants to take a picture of, or an area near the face of a person is controlled not to be a composite area.

Evaluation Value Calculation Processing

The details of the evaluation value calculation processing performed in S203 of FIG. 2A will now be described. Among the candidate areas set in S202, those that do not overlap the prohibited area are individually subjected to the following processing. That is, the image processor 124 successively regards each of the pixels of each such area as the pixel of interest and calculates the sum of differences in luminance value between the pixel of interest and eight pixels around or near the pixel of interest. After calculating the total sum of the sums of luminance differences for all the pixels in the candidate area, the image processor 124 normalizes the total sum by the number of pixels, thereby calculating a luminance evaluation value Ey.

Specifically, when the size of the candidate area is s pixels in the horizontal direction and t pixels in the vertical direction, the coordinates of the pixel of interest are (x, y), and the luminance at the coordinates (x, y) is L(x, y), the luminance evaluation value Ey can be obtained by the following equation:

$$Ey = \frac{\sum_{y=0}^{t-1}\sum_{x=0}^{s-1}\left(\sum_{m=y-1}^{y+1}\sum_{n=x-1}^{x+1}|L(x,y)-L(n,m)|\right)}{s \cdot t}$$

Like the luminance, for color differences u and V and a distance, the image processor 124 calculates color evaluation values Eu and Ev and a distance evaluation value Ed using similar methods. Note that the evaluation values may be obtained using other methods. For example, the luminance evaluation value Ey can be the reciprocal of the luminance maximum value or the luminance average value of pixels in the candidate area. The distance evaluation value Ed can be the minimum value or the average value (or the reciprocal thereof) of subject distances corresponding to pixels in the candidate area.

The image processor 124 calculates a final evaluation value E from the luminance value Ey, the color evaluation values Eu and Ev, and the distance evaluation value Ed using the following equation:

$$E = Wy \times Ey + Wu \times Eu + Wv \times Ev + Wd \times Ed$$

In the above equation, Wy is a weight for the luminance evaluation value Ey. Likewise, Wu, Wv, and Wd are weights for the respective evaluation values. The system controller 150 controls a candidate area serving as a composite area in accordance with the circumstances by changing the weights in accordance with the image capturing mode or the captured scene. By setting one or more weights to zero, control can be applied to determine a composite area while specializing in a particular parameter among luminance, color, and distance.

For example, the evaluation value E based on differences between the pixel of interest and the surrounding pixels basically becomes smaller as the variation in brightness, color, and subject distance among the pixels in the candidate area becomes smaller. Therefore, the evaluation value E becomes smaller in an area like blue sky, and the evaluation value E becomes greater in an area where there are subjects with various colors at various distances, like cityscape.

In general image capturing, an area such as sky often has a low importance level, except for the mode of capturing an image of starlit sky. Therefore, according to the embodiment, when a commemorative photo is taken in front of a famous building or the like, not only a face area, but also a building area is difficult to be a composite area, and an area, like sky, where the color or luminance is relatively even is likely to be a composite area. By specializing in the distance evaluation value, when the subject distance represented by the evaluation value Ed is short or the image displacement amount (parallax) is small, the weight Wd can be made greater in order that the final evaluation value E be made greater and the candidate area be less likely to be selected.

When the distance evaluation value Ed is the reciprocal of the minimum value or the average value, the weights can be determined such that an area where the luminance evaluation value Ey and the distance evaluation value Ed are small is likely to be determined as a composite area. A candidate area where the evaluation value E is maximum or a candidate area where the evaluation value E is minimum can be selected in accordance with the methods of calculating the evaluation values Ey, Eu, Ev, and Ed.

In this way, an evaluation value regarding one or more of luminance information, color information, and distance information is obtained, and a candidate area that has an evaluation value that best matches a predefined condition under which it is considered that the importance level is low is determined as a composite area. Therefore, a composite area can be determined even when no subject area is detected, and, with regard to areas other than a subject area, it is more likely that an area whose estimated importance level is low will be combined with a sub image.

Combining Operation in Moving Image Mode

Like the above-described operation in the still image mode, a composite image can also be generated in the moving image mode. A composite image generating operation in the moving image mode will now be described with reference to FIG. 2B. Steps for performing the same operation as that in the still image mode are assigned the same reference numerals, and descriptions thereof are omitted.

In the moving image mode, it is assumed that both the main image capturing unit 190 and the sub image capturing unit 191 are capturing a moving image, or both a main moving image and a sub moving image are being reproduced from the recording medium 104. The reproducing processing is executed by the image processor 124.

In S208, the system controller 150 obtains a main frame and a distance map associated with the main frame. The main frame and the distance map can be obtained from the image processor 124. The main frame is a frame image of a main image.

In S209, the system controller 150 obtains a sub frame. The sub frame can be obtained from the image processor 124. The sub frame is a frame image of a sub image. In steps S202 to S205, the same processing as that in the still image mode is performed.

In S214, the image processor 124 generates a composite frame by combining the sub frame obtained in S209 with the main frame obtained in S208 based on the composite area determined in S205. When the sizes of the sub frame and the composite area are different, the image processor 124 resizes the sub frame to be less than or equal to the size of the composite area, and then combines the main frame and the resized sub frame.

In S215, the system controller 150 determines whether an end instruction has been input through the operation unit 170. When the system controller 150 determines that an end instruction has been input, the process proceeds to S216. Otherwise, the process returns to S208, and the system controller 150 executes similar processing on the next frame of the main image and of the sub image.

The processing in S202 to S205 can be executed every few frames of the moving image instead of for each frame. In this case, for frames for which no processing in S202 to S205 is performed, the same composite area as that of all the frames can be used. Alternatively, a scene change can be detected between frames, and, if there is a scene change, the processing in S202 to S205 can be performed.

In S216, the image processor 124 applies recording processing to the composite frame generated in S214. For example, the recording processing includes file header generation and coding. The image processor 124 records an image file including the composite frame in the recording medium 104 via the memory controller 115 and the recording medium I/F 118.

In the moving image mode, the methods of calculating the evaluation values can be changed. For example, the evaluation value E can be calculated using the following equation:

$$E = Wy \times Ey + Wu \times Eu + Wv \times Ev + Wd \times Ed + Wf$$

Since the evaluation values other than the weight Wf are the same as those in the still image mode, descriptions thereof are omitted. The weight Wf is used for making a candidate area corresponding to a composite area determined in the previous frame more likely to be determined as a composite area. This is because consecutive moving image frames are highly correlated with each other and are highly likely to have the same composite area, and this is also to prevent the composite area from frequently moving. In this manner, advantageous effects that are the same as or similar to those in the still image mode can be achieved in the moving image mode.

Other Embodiments

In the above-described embodiment, a composite area is determined from among candidate areas based on an evaluation value regarding at least one of luminance information, color information, or distance information. Alternatively, a composite area can be determined based only on distance information. For example, among candidate areas, a candidate area that has distance information (such as the average distance or the maximum value) that is greater than a predetermined first threshold and that is the largest can be determined as a composite area. Alternatively, among candidate areas, a candidate area that has distance information (such as the average distance or the maximum value) that is less than a predetermined second threshold and that is the smallest can be determined as a composite area. In doing so, an area of a very distant subject or a very close subject can be determined as a composite area. The first threshold can be made greater than or equal to the second threshold (first threshold ≥ second threshold).

In addition to distance information of candidate areas, distance information of a prohibited area can also be taken into consideration. For example, a candidate area whose distance information (such as the average distance or the maximum value) has the greatest difference from distance information (such as the distance average value or the minimum value) of a prohibited area or a subject area can be determined as a composite area.

For example, in the case of the scene illustrated in FIGS. 3A to 3D, a background area whose distance information has a great difference from distance information of a prohibited area set in the center of the image (FIG. 3C) or the subject area and its surrounding areas (FIG. 3D) has a lower importance level. If the center of the image is not a prohibited area as in FIG. 3D, the difference in distance information between a building at the center of the image and the prohibited area 301 is much smaller than the difference in distance information between the prohibited area 301 and the background. Thus, a building area is prevented from being determined as a composite area.

Alternatively, a candidate area whose distance information (such as the average distance or the minimum value) is not only greater, but also smaller than distance information of a prohibited area or a subject area, and has the greatest difference can be determined as a composite area.

Although the above-described embodiment has discussed the case of selecting a candidate area with the minimum or maximum evaluation value or distance information, the advantageous effects are achievable when the evaluation value or distance information is not necessarily the minimum or maximum. Thus, one of candidate areas whose evaluation value or distance information is smaller than a threshold can be selected, or one of candidate areas whose evaluation value or distance information is greater than a threshold can be selected. If there are corresponding candidate areas, a condition for selecting one area can be arbitrarily set. It can be configured that the user selects one of candidate areas.

Embodiments can also be realized by a process of supplying a program realizing one or more functions of the above-described embodiment to a system or an apparatus via a network or a storage medium, and reading and executing the program with one or more processors included in a computer of the system or apparatus. Embodiments can also be realized by a circuit (such as an application-specific integrated circuit (ASIC)) that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to embodiments of the invention, an image processing apparatus and an image processing method that determines an area to be combined with an image, regardless of the presence of the face of a person can be provided.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225085, filed Nov. 17, 2015, which is hereby incorporated by reference herein in its entirety.

What is claimed is:

1. An image processing apparatus comprising:
one or more processors; and
a memory storing instructions which, when the instructions are executed by the one or more processors, cause the image processing apparatus to function as:
an obtaining unit configured to obtain a first image and a second image;
a determination unit configured to determine a partial area of the first image as a composite area to be combined with the second image; and
a combining unit configured to combine the second image with the composite area,
wherein the determination unit determines the composite area based on distance information with regard to a plurality of partial areas of the first image, and
wherein the determination unit further sets a prohibited area in the first image, and does not set, among the plurality of partial areas, a partial area that overlaps the prohibited area as the composite area.

2. The image processing apparatus according to claim 1, wherein the prohibited area is at least one of a central area of the first image or a particular subject area and its surrounding areas included in the first image.

3. The image processing apparatus according to claim 1, wherein the determination unit determines the composite area from, among the plurality of partial areas, partial areas whose distance information has a difference from distance information of the prohibited area that is greater than a threshold.

4. The image processing apparatus according to claim 1, wherein the determination unit determines the composite area from, among the plurality of partial areas, partial areas whose distance information is greater than a predetermined threshold.

5. The image processing apparatus according to claim 1, wherein the determination unit determines the composite area from, among the plurality of partial areas, partial areas whose distance information is less than a predetermined threshold.

6. The image processing apparatus according to claim 1, wherein the determination unit determines the composite area from, among the plurality of partial areas, partial areas whose variation regarding the distance information is less than a threshold.

7. The image processing apparatus according to claim 1, wherein the distance information is information indicating a subject distance in units of pixels of the first image.

8. An image processing apparatus comprising:
one or more processors; and
a memory storing instructions which, when the instructions are executed by the one or more processors, cause the image processing apparatus to function as:
an obtaining unit configured to obtain a first image and a second image;
a determination unit configured to determine a partial area of the first image as a composite area to be combined with the second image; and
a combining unit configured to combine the second image with the composite area,
wherein the determination unit determines the composite area from, among a plurality of partial areas of the first image, partial areas whose variation regarding at least one of luminance information and color information is less than a threshold, and
wherein the determination unit further sets a prohibited area in the first image, and does not set, among the plurality of partial areas, a partial area that overlaps the prohibited area as the composite area.

9. An image capturing apparatus comprising:
an image sensor;
and
an image processing apparatus comprising:
one or more processors; and
a memory storing instructions which, when the instructions are executed by the one or more processors, cause the image processing apparatus to function as:
a generating unit configured to generate a first image and a second image from an image obtained by the image sensor;
an obtaining unit configured to obtain a first image and a second image;
a determination unit configured to determine a partial area of the first image as a composite area to be combined with the second image; and
a combining unit configured to combine the second image with the composite area,
wherein the determination unit determines the composite area based on distance information with regard to a plurality of partial areas of the first image, and
wherein the determination unit further sets a prohibited area in the first image, and does not set, among the plurality of partial areas, a partial area that overlaps the prohibited area as the composite area.

10. An image processing method executed by an image processing apparatus, comprising:
   obtaining a first image and a second image;
   determining a partial area of the first image as a composite area to be combined with the second image based on distance information with regard to a plurality of partial areas of the first image; and
   combining the second image with the composite area,
   wherein a prohibited area in the first image is further set, and, among the plurality of partial areas, a partial area that overlaps the prohibited area is not set as the composite area.

11. A non-transitory computer-readable storage medium storing computer executable instructions for causing a computer to execute an image processing method by an image processing apparatus, the image processing method comprising:
   obtaining a first image and a second image;
   determining a partial area of the first image as a composite area to be combined with the second image based on distance information with regard to a plurality of partial areas of the first image; and
   combining the second image with the composite area,
   wherein a prohibited area in the first image is further set, and, among the plurality of partial areas, a partial area that overlaps the prohibited area is not set as the composite area.

* * * * *